US009283822B1

(12) United States Patent
Krapf

(10) Patent No.: US 9,283,822 B1
(45) Date of Patent: Mar. 15, 2016

(54) TRIPLE-PIVOTING TRAILER COUPLER SYSTEMS

(71) Applicant: Geordie Krapf, Firestone, CO (US)

(72) Inventor: Geordie Krapf, Firestone, CO (US)

(*) Notice: Subject to any disclaimer, the term of this patent is extended or adjusted under 35 U.S.C. 154(b) by 0 days.

(21) Appl. No.: 13/859,931

(22) Filed: Apr. 10, 2013

Related U.S. Application Data

(60) Provisional application No. 61/622,075, filed on Apr. 10, 2012.

(51) Int. Cl.
*B60D 1/24* (2006.01)
*B60D 1/155* (2006.01)
*B60D 1/145* (2006.01)

(52) U.S. Cl.
CPC *B60D 1/24* (2013.01); *B60D 1/145* (2013.01); *B60D 1/155* (2013.01)

(58) Field of Classification Search
CPC .......... B60D 1/00; B60D 1/145; B60D 1/155; B60D 2001/548
USPC ......................................... 280/492, 493, 494
See application file for complete search history.

(56) References Cited

U.S. PATENT DOCUMENTS

| | | | |
|---|---|---|---|
| 2,692,150 A | 10/1954 | Maier | |
| 3,126,210 A | 3/1964 | Hill | |
| 3,612,576 A | 10/1971 | Marler | |
| 4,711,461 A * | 12/1987 | Fromberg | 280/494 |
| 5,037,121 A * | 8/1991 | Gallatin | 280/426 |
| 5,531,283 A * | 7/1996 | Austin et al. | 180/53.1 |
| 5,647,604 A * | 7/1997 | Russell | 280/492 |
| 5,765,851 A * | 6/1998 | Parent | 280/491.4 |
| 6,042,135 A | 3/2000 | Ross | |
| 6,619,686 B1 * | 9/2003 | Klar | 280/491.3 |
| 6,779,808 B2 | 8/2004 | Connor | |
| 7,004,490 B2 * | 2/2006 | Klar | 280/491.3 |
| 8,118,323 B2 * | 2/2012 | Hudson | 280/494 |
| 8,505,952 B1 * | 8/2013 | Choquette | 280/491.2 |
| D693,746 S * | 11/2013 | Roeber | D12/162 |
| 8,690,181 B1 * | 4/2014 | Roeber | 280/494 |
| 2010/0225092 A1 | 9/2010 | Hudson | |

* cited by examiner

*Primary Examiner* — Kevin Hurley
*Assistant Examiner* — Michael Stabley
(74) *Attorney, Agent, or Firm* — RG Patent Consulting, LLC; Rachel Gilboy

(57) ABSTRACT

The double-pivoting trailer coupler system and/or triple-pivoting trailer coupler system are designed to replace a standard trailer coupler with a ball hitch. It is designed to slide into the existing bumper hitch mounted to the frame of the tow vehicle, eliminating the need for a ball hitch between the frame mounted receiver and the trailer. The coupler systems reduce the possibility of equipment failure, making a secure connection between the tow vehicle and trailer hitch. They increase safety and allow for a shorter turning radius when in-use minimizing wear on the trailer, prime mover and tires.

18 Claims, 6 Drawing Sheets

TRIPLE-PIVOTING TRAILER COUPLER SYSTEMS

CROSS-REFERENCE TO RELATED APPLICATION

The present application is related to and claims priority from prior provisional application Ser. No. 61/622,075, filed Apr. 10, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of trailer coupling means and more specifically relates to a pivoting trailer coupler system for use in coupling a trailer to a tow vehicle.

2. Description of the Related Art

Many individuals use a trailer to haul objects between locations. Trucks or tractors may be used to pull trailers. Trailers must be coupled to the prime mover in a safe and efficient manner to prevent accidents that may be dangerous to life and limb. The traditional trailer coupler attaches to a tow vehicle by means of a ball hitch, adding extra components between the tow vehicle receiver and the trailer itself. Extra components increase the probability of equipment failure, while also increasing the potential for human error during attachment. Equipment failure due to either of these reasons can have devastating results in the form of trailer de-coupling accidents. A de-coupled trailer while driving, whether by human error or component failure can cause injury or death to individuals or livestock, and/or expensive property damage. A trailer coupler that eliminates excessive components while ensuring a more secure trailer attachment is desirable.

Various attempts have been made to solve the above-mentioned problems such as those found in U.S. Pat. No. 6,779,808 to Connor; U.S. Pat. No. 3,612,576 to Marler; and U.S. Pat. No. 2,692,150 to Maier. This art is representative of trailer couplers. None of the above inventions and patents, taken either singly or in combination, is seen to describe the invention as claimed.

Ideally, a trailer coupler should provide ease of use and, yet would operate reliably and be manufactured at a modest expense. Thus, a need exists for a reliable triple- or double-pivoting trailer coupler system to easily, safely, and securely attach a trailer to a tow vehicle and to avoid the above-mentioned problems.

BRIEF SUMMARY OF THE INVENTION

In view of the foregoing disadvantages inherent in the known trailer coupler art, the present invention provides a novel pivoting trailer coupler system. The present invention provides a triple- and double-pivoting trailer coupler assembly that easily and securely attaches a tow vehicle to a trailer providing an excellent turning radius for trailer when used.

The triple- and double-pivoting trailer coupler system(s) are designed to replace a standard trailer coupler that attaches to the tow vehicle by a ball hitch. They are designed to slide into the existing tow hitch receiver mounted to the frame of the tow vehicle, eliminating the need for the ball hitch connector between the tow vehicle and the trailer itself. This design reduces the possibility of equipment or human failure, effectively ensuring a secure connection between the tow vehicle and trailer. The double-pivoting trailer coupler system dramatically reduces the risk for accidental trailer de-coupling, which may prevent damage to property and equipment (as does the triple-pivoting embodiment). It provides a simple, time-saving manner to connect the trailer to the tow vehicle while reducing the chance for mistake due to human error. The pivoting trailer coupler system can be used on trailers of all types, from a light duty trailer to a heavy-duty camper trailer and the like.

A double-pivoting trailer coupler system is disclosed herein, in an embodiment, comprising a double-pivoting trailer coupler assembly having a housing with an inner volume, an outer enclosure, a first and second end, and a first and second mounting bolt aperture. It further comprises a first and second pin aperture, a pivoting tongue assembly with a proximate and distal end, and a first and second pin. The device further comprises a first, second, third, and fourth bearing assembly in preferred embodiments.

The vehicle coupling assembly comprises a front and back end, a coupler pin aperture, and a receiver pin aperture. The double-pivoting trailer coupler assembly comprises in combination: a housing, a pivoting tongue assembly, and vehicle coupler assembly. The vehicle coupler assembly, pivoting tongue assembly, and housing occupy a same plane when used for pulling. The inner volume of the housing is defined by the outer enclosure. The outer enclosure of the housing is preferably square tubing, attachable to a trailer frame. The opening of the second end of the housing is able to receive the trailer frame for fixable attachment thereto. The outer enclosure of the housing has a first aperture and second aperture for placement of mounting bolts to the trailer frame.

The housing, pivoting tongue assembly and vehicle coupling assembly preferably comprise ferrous material given its relative inexpensive, yet durable nature and the ease by which it may be maintained. The vehicle coupling assembly may comprises solid square stock. The first end of the housing is recessed to receive the pivoting tongue assembly. The first and second pin aperture of the housing are rotatably attached to the distal end of the pivoting tongue assembly via the second pin, third and fourth bearing. In combination they act in a capacity of a first universal joint.

The third and fourth bearing assembly are parallel to each other and horizontally oriented in the first and second pin aperture of the housing. The proximate end of the pivoting tongue assembly is rotatably attached to the back end of the vehicle coupling assembly via the coupler pin aperture. The first pin, and first and second bearing act in a capacity of a second universal joint. The first and second bearing assembly are oriented parallel to each other, and vertically oriented in the coupler pin aperture of the vehicle coupling assembly. The first and second universal joint work in combination to promote ease of swiveling and decrease the turning radius when a trailer is being pulled.

The first and second pin(s) may be retained in the housing by snap rings. The double-pivoting trailer coupler assembly allows security and ease of connection with a tow vehicle via double-pivoting action. The vehicle coupling assembly comprises a brake safety switch, a receiver pin, and an aperture for removable attachment to a vehicle receiver. The double-pivoting trailer coupler assembly does not comprise a ball connector. The front end of the vehicle coupling assembly attaches to the vehicle receiver, being coupled with a receiver pin. The housing attaches directly to the trailer frame via mounting bolts, completing the attachment. The vehicle coupling assembly is available in at least three sizes: 1¼", 2", and 2½" square material to fit the vehicle receiver. The vehicle coupler assembly and housing are in coupled communication through the pivoting tongue assembly. The double-pivoting trailer coupler assembly is useful to promote ease of movement when towing a pull-trailer, thereby increasing safety and allowing for a shorter turning radius when in an in-use condition.

A triple-pivoting trailer coupler system is also disclosed herein having two more axis of movement over and above what is offered via the double-pivoting trailer coupler version; wherein a first axis of movement in the triple-pivoting embodiment allows a trailer to follow in a turn; a second allows the trailer to 'pitch' for inclines and a third allows the trailer to 'roll'.

A kit is also disclosed herein including at least one double-pivoting trailer coupler assembly, one receiver pin, two mounting bolts, two mounting bolt nuts, and at least one set of user instructions.

A method of use for a double-pivoting trailer coupler system (and triple-version) is also disclosed herein comprising the steps of: attaching a double-pivoting trailer coupler assembly to a trailer frame; backing a tow-vehicle to the front of the pull-type trailer; attaching the double-pivoting trailer coupler assembly to the vehicle coupling assembly; towing the trailer; and disconnecting the double-pivoting trailer coupler assembly from the tow-vehicle.

The present invention holds significant improvements and serves as a pivoting trailer coupler system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pivoting trailer coupler system, constructed and operative according to the teachings of the present invention.

The various embodiments of the present invention will hereinafter be described in conjunction with the appended drawings, wherein like designations denote like elements.

DETAILED DESCRIPTION

Figure 1:
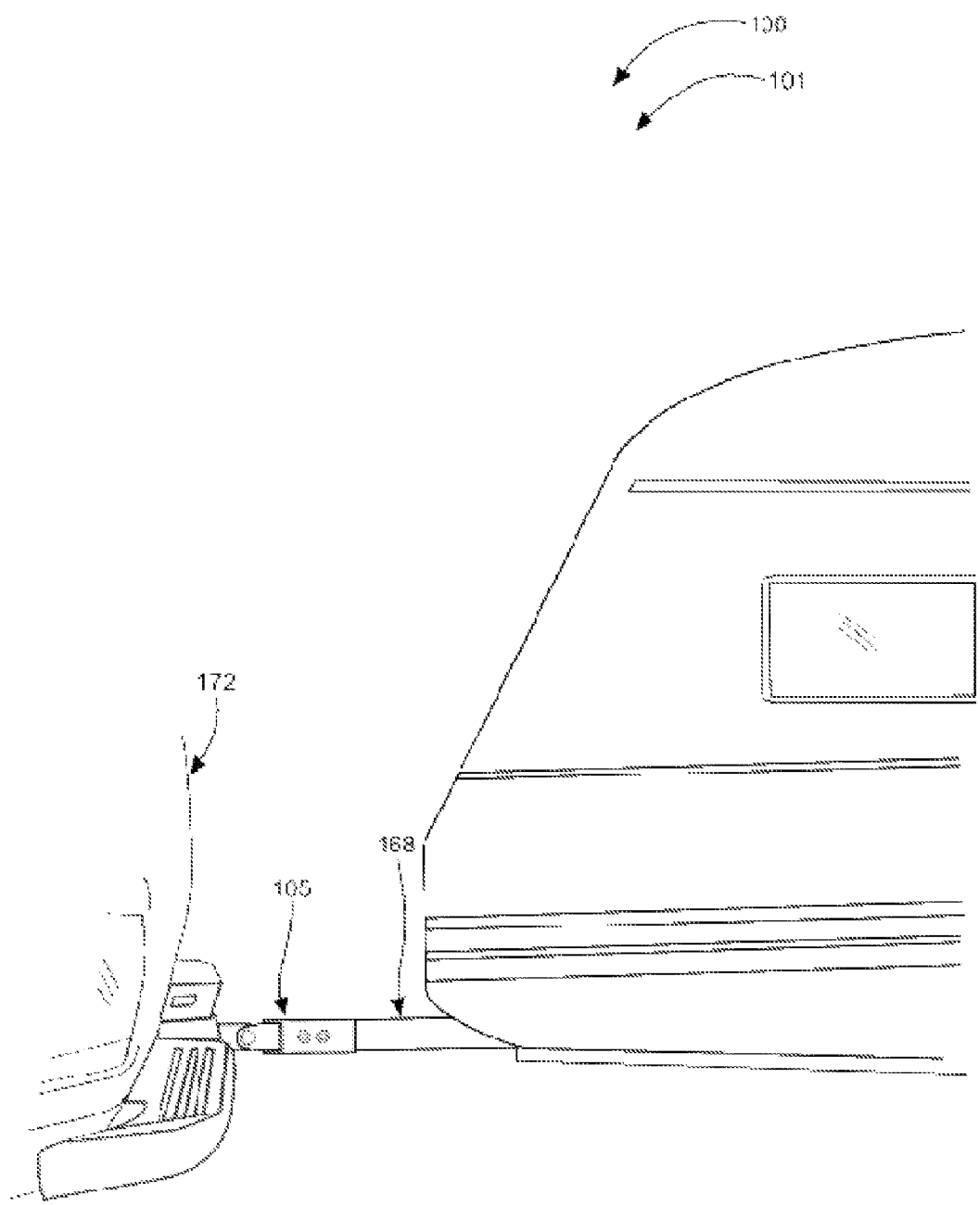
FIG. 1 shows a perspective view illustrating the double-pivoting trailer coupler system in an in-use condition according to an embodiment of the present invention.

As discussed above, embodiments of the present invention relate to a trailer coupler device and more particularly to a (double- and triple-) pivoting trailer coupler system as used to improve the ease of use and security of tow vehicle and trailer connections.

Generally speaking, the double-pivoting trailer coupler system of the present invention is a double-pivoting trailer hitch alignment assembly for swiveling the coupling assembly to easily align and couple a trailer to a tow-vehicle. The steel-fabricated joint system will mount directly onto the trailer frame and attach to most trucks and SUV's frame mounted receiver hitch. The bottom of the mounting point will sit in the coupler and have a 360 degree pivot point for the trailer to rotate during a turn from the tow vehicle. There may be three size variations depending upon the class of trailer. One variation may be 1¼" square for up to 2,000 lbs of towing capacity. The second variation may be 2" square for up to 12,000 lbs of towing capacity. Yet another variation may be 2½" square for up to 18,000 lbs of towing capacity. Other embodiments may be considered within the scope of the present disclosure.

A triple-pivoting trailer coupler system is also disclosed herein having two more axis of movement over and above what is offered via the double-pivoting trailer coupler version; wherein a first axis of movement in the triple-pivoting embodiment allows a trailer to follow in a turn; a second allows the trailer to 'pitch' for inclines and a third allows the trailer to 'roll'.

Referring now to the drawings by numerals of reference there is shown in FIGS. 1-4, various views of double-pivoting trailer coupler system 100 as used within double-pivoting trailer coupler assembly 105 according to an embodiment of the present invention.

Referring now to FIG. 1, a perspective view illustrating double-pivoting trailer coupler system 100 in an in-use condition 101 according to an embodiment of the present invention.

Double-pivoting trailer coupler system 100 comprises double-pivoting trailer coupler assembly 105 having housing 120, an inner volume 122, outer enclosure 124, first end 126, and second end 128. The present invention further preferably comprises first aperture 130, second aperture 132, first pin aperture 134, and second pin aperture 136. Pivoting tongue assembly 140 comprises proximate end 142, distal end 144, first pin 146 and second pin 148. Further, the device comprises first bearing assembly 150, second bearing assembly 152, third bearing assembly 154, and fourth bearing assembly 156.

Figure 2:
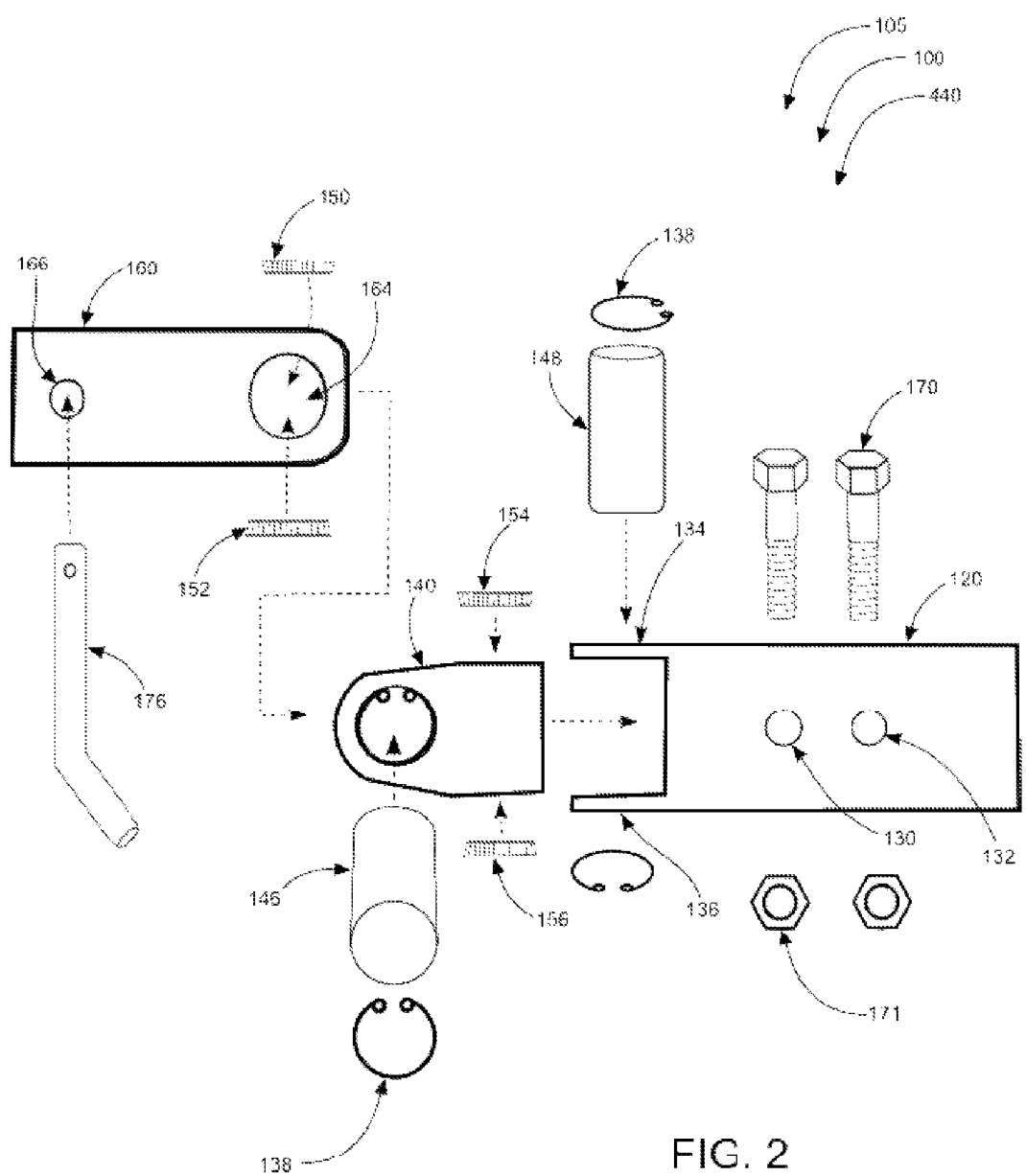
FIG. 2 is an exploded view illustrating a pivoting trailer coupler assembly of the double-pivoting trailer coupler system according to an embodiment of the present invention of FIG. 1.

Referring now to FIG. 2, an exploded view illustrating double-pivoting trailer coupler system 100 according to an embodiment of the present invention of FIG. 1.

Vehicle coupling assembly 160 comprises front end 161, back end 162, coupler pin aperture 164, and receiver pin aperture 166. Double-pivoting trailer coupler assembly 105 comprises in combination: housing 120, pivoting tongue assembly 140, and vehicle coupling assembly 160. Vehicle coupling assembly 160, pivoting tongue assembly 140, and housing 120 occupy a same plane when a trailer is being pulled. Inner volume 122 of housing 120 is defined by outer enclosure 124. Outer enclosure 124 of housing 120 preferably comprises square tubing, attachable to trailer frame 168. The opening of second end 128 of housing 120 is able to receive trailer frame 168 for fixable attachment. Outer enclosure 124 of housing 120 has first aperture 130 and second aperture 132 for placement of mounting bolts 170 to trailer frame 168.

Housing 120, pivoting tongue assembly 140, and vehicle coupling assembly 160 comprise ferrous material in preferred embodiment due to the durable nature and ease of manufacture/repair. Vehicle coupling assembly 160 may comprise solid square stock for strength and safety in use. First end 126 of housing 120 is recessed to receive pivoting tongue assembly 140. First pin aperture 134 and second pin aperture 136 of housing 120 are rotatably attached to distal end 144 of pivoting tongue assembly 140 via second pin 148, third bearing assembly 154 and fourth bearing assembly 156. In combination they act in a capacity of a first universal joint.

Third bearing assembly 154 and fourth bearing assembly 156 are parallel to each other and horizontally oriented in first pin aperture 134 and second pin aperture 136 of housing 120. Proximate end 142 of pivoting tongue assembly 140 is rotatably attached to back end 162 of vehicle coupling assembly 160 via coupler pin aperture 164. First pin 146, first bearing assembly 150 and second bearing assembly 152 are able to act in a capacity of a second universal joint. First bearing assembly 150 and second bearing assembly 152 are oriented parallel to each other, and vertically oriented in coupler pin aperture 164 of vehicle coupling assembly 160. The first and second universal joint(s) work in combination to promote ease of swiveling and decrease turning radius.

Figure 3:
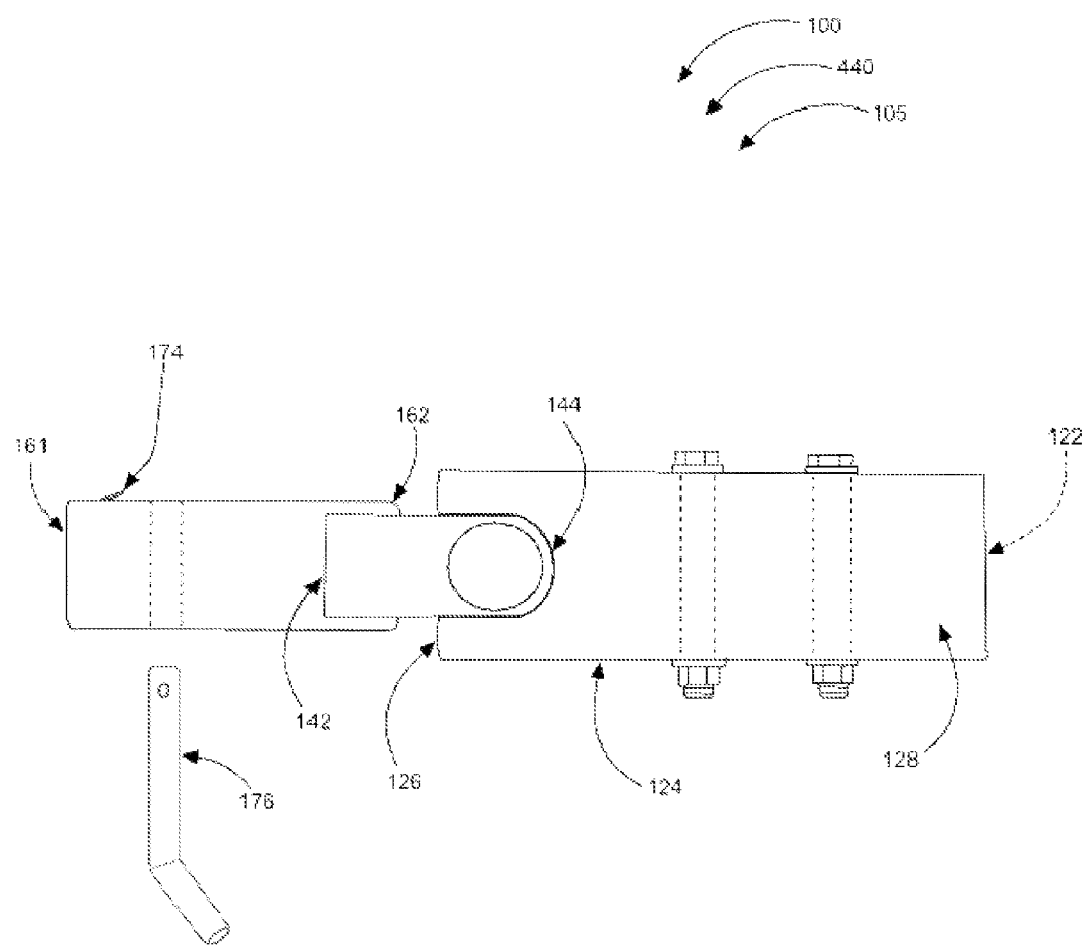
FIG. 3 is a top view illustrating the pivoting trailer coupler assembly of the double-pivoting trailer coupler system according to an embodiment of the present invention of FIG. 1.

Referring now to FIG. 3, a top view illustrating double-pivoting trailer coupler system 100 according to an embodiment of the present invention of FIG. 1.

First pin 146 and second pin 148 are retained in housing 120 by snap rings 138. Double-pivoting trailer coupler assembly 105 allows security and ease of connection with a tow vehicle 172 via double-pivoting action. Vehicle coupling assembly 160 comprises brake safety switch 174, receiver pin 176, and receiver pin aperture 166 for removable attachment to a vehicle receiver. Double-pivoting trailer coupler assembly 105 does not have a ball connector. Front end 161 of vehicle coupling assembly 160 attaches to a vehicle receiver, being coupled with receiver pin 176. Housing 120 attaches directly to trailer frame 168 via mounting bolts 170, completing the attachment. Vehicle coupling assembly 160 is available in three standard sizes: 1¼", 2", and 2½" square material to fit the vehicle receiver. Vehicle coupling assembly 160 and housing 120 are in coupled communication through the pivoting tongue assembly 140.

Figure 4:
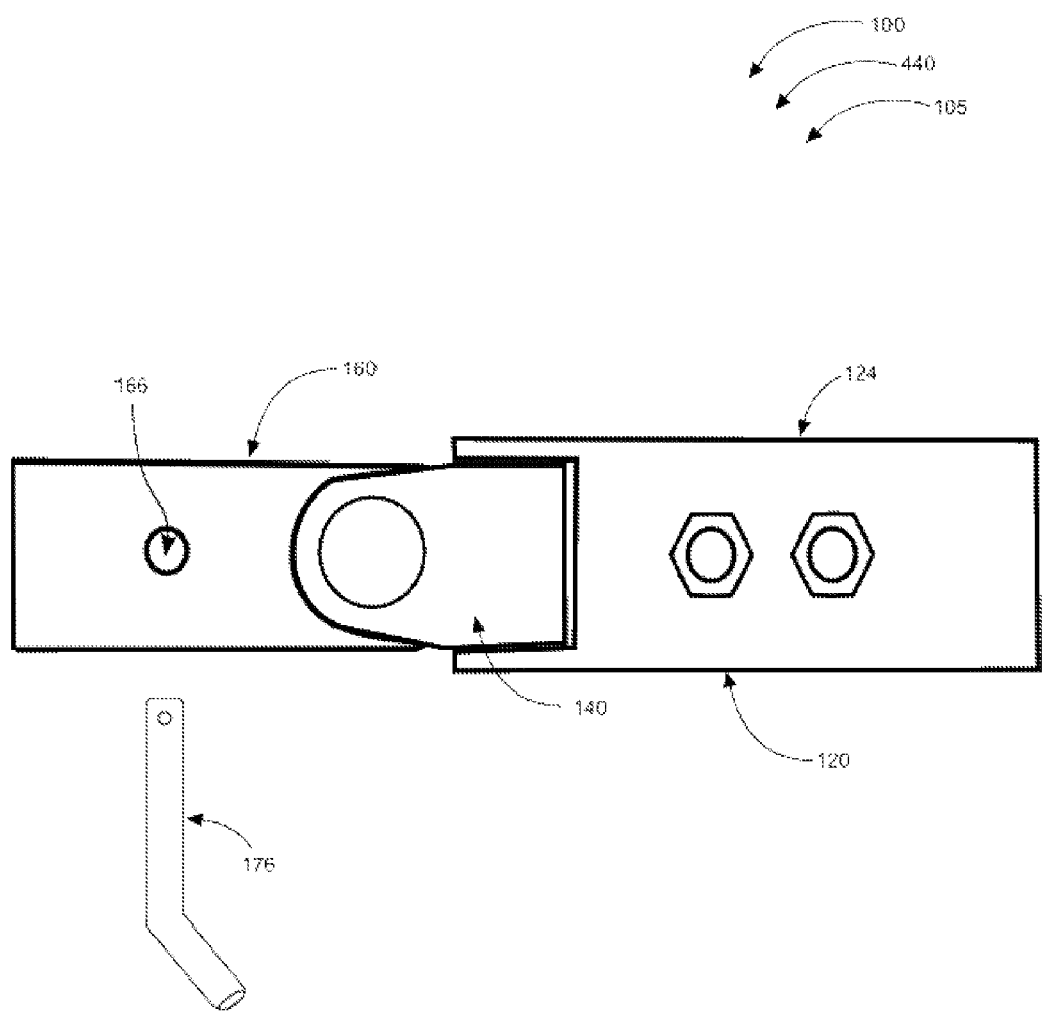
FIG. 4 is a side view illustrating the pivoting trailer coupler assembly according to an embodiment of the present invention of FIG. 1.

Referring now to FIG. 4, a side view illustrating double-pivoting trailer coupler system 100 according to an embodiment of the present invention of FIG. 1. Double-pivoting trailer coupler assembly 105 is useful to promote ease of movement when towing a pull-trailer, thereby increasing safety and allowing for a shorter turning radius when in an in-use condition 101.

Double-pivoting trailer coupler system 100 may further comprise kit 440 including the following parts: at least one double-pivoting trailer coupler assembly 105, one receiver pin 176, two mounting bolts 170, two mounting bolt nuts 171, and at least one set of user instructions for installation. Double-pivoting trailer coupler system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different pin/fastener/retaining means and combinations thereof, parts may be sold separately. Double-pivoting trailer coupler system 100 may be manufactured and provided for sale in a wide variety of sizes and shapes for a wide assortment of trailering/towing/pulling applications.

Figure 5:
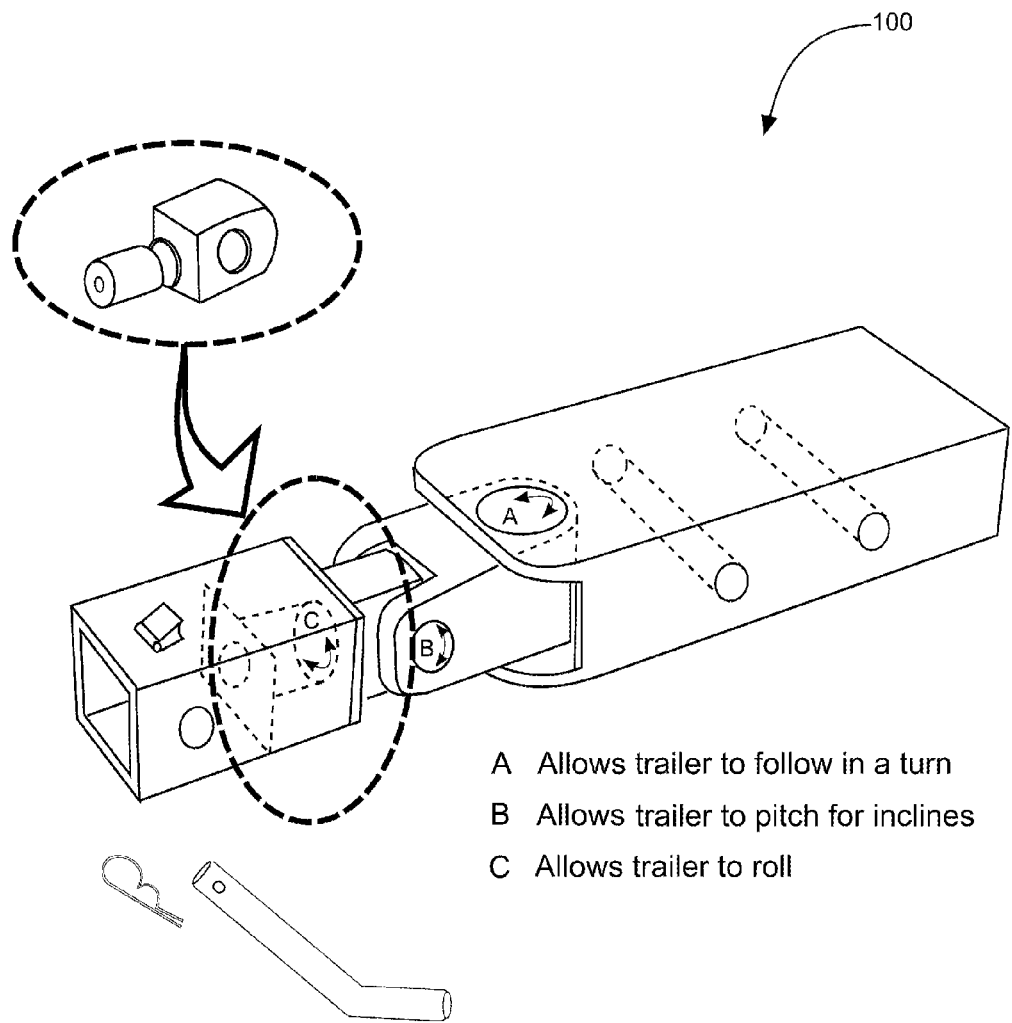
FIG. 5 shows a perspective view illustrating a triple-pivoting trailer coupler system in an in-use condition according to an embodiment of the present invention.

A triple-pivoting trailer coupler system, as shown in FIG. 5 comprises two more axis of movement over and above what is offered via the double-pivoting trailer coupler version (with similar components but extra necessary bearing, pins and the like as indicated in the present figure); wherein a first axis of movement (labeled A) in the triple-pivoting embodiment allows a trailer to follow in a turn; a second axis of movement (labeled B) allows the trailer to 'pitch' for inclines and a third axis of movement (labeled C) allows the trailer to 'roll'.

Figure 6:
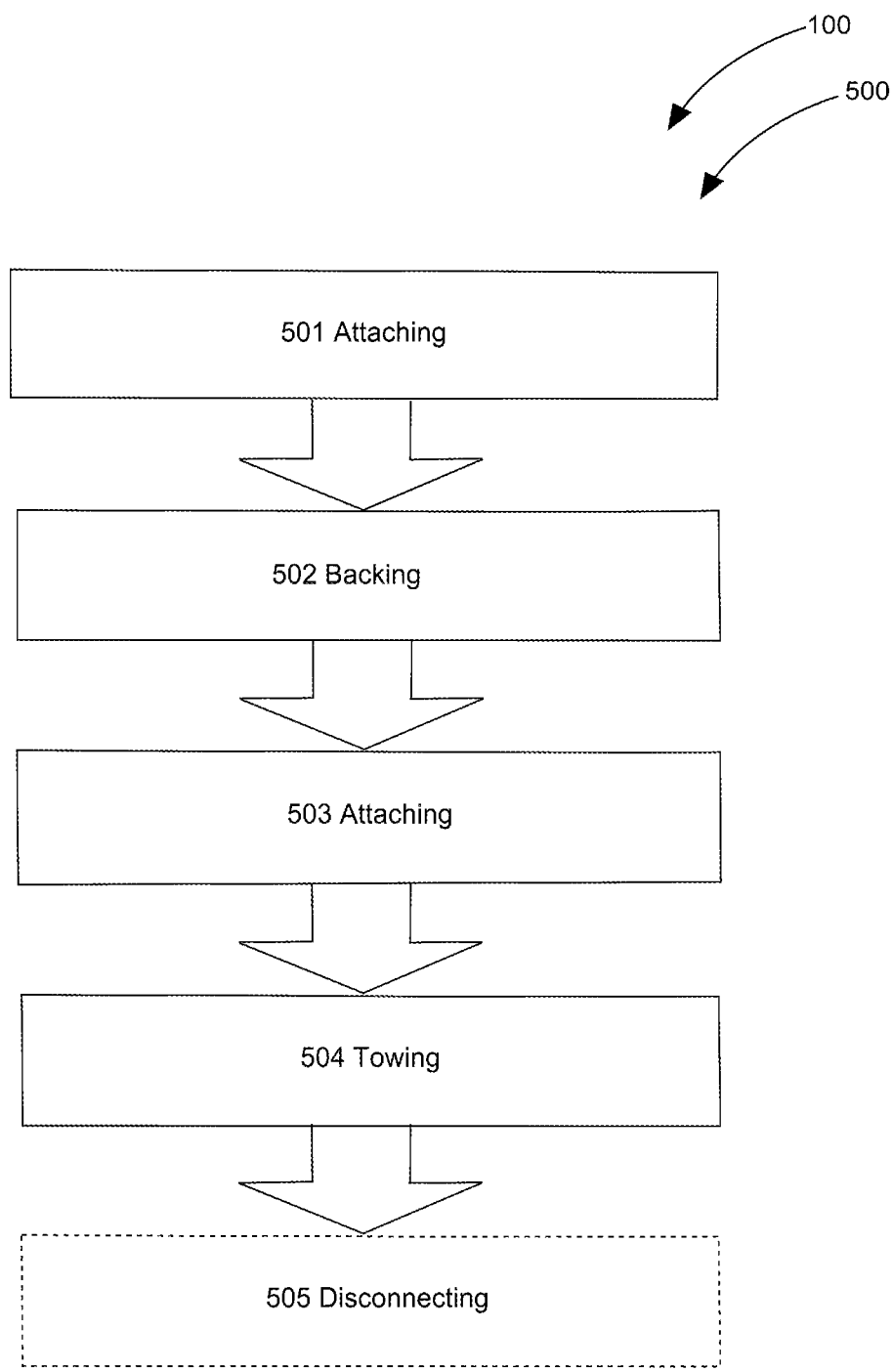
FIG. 6 is a flowchart illustrating a method of use for the double-pivoting trailer coupler system according to an embodiment of the present invention of FIGS. 1-5.

Referring now to FIG. 6, a flowchart illustrating method of use 500 for double-pivoting trailer coupler system 100 according to an embodiment of the present invention of FIGS. 1-5.

A method of using (method of use 500) the double-pivoting trailer coupler system comprises the steps of: step one 501 attaching a double-pivoting trailer coupler assembly to a trailer frame; step two 502 backing a tow-vehicle to the front of the pull-type trailer; step three 503 attaching the double-pivoting trailer coupler assembly to the vehicle coupling assembly; step four 504 towing the trailer; step five 505 disconnecting the double-pivoting trailer coupler assembly from the tow-vehicle.

It should be noted that step 505 is an optional step and may not be implemented in all cases. Optional steps of method 500 are illustrated using dotted lines in FIG. 6 so as to distinguish them from the other steps of method 500.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pivoting trailer coupler system comprising:
   a pivoting trailer coupler assembly having;
      a housing having;
         an inner volume;
         an outer enclosure having, a first end, a second end, a first aperture; and a second aperture;
         a first pin aperture; and
         a second pin aperture;
      a pivoting tongue assembly having;
         an proximate end;
         a distal end;
         a first pin; and
         a second pin;
      a first bearing assembly;
      a second bearing assembly;
      a third bearing assembly; and
      a fourth bearing assembly;
      a vehicle coupling assembly having;
         a front end;
         a back end;
         a coupler pin aperture, and;
         a receiver pin aperture;
   wherein said pivoting trailer coupler assembly comprises in combination: said housing, said pivoting tongue assembly, and said vehicle coupling assembly;
   wherein said inner volume of said housing is defined by said outer enclosure;
   wherein said outer enclosure is square tubing, said square tubing attachable to a trailer frame, said trailer frame fitting in said inner volume;
   wherein said opening of said second end of said housing is able to receive said trailer frame for fixable attachment;
   wherein said outer enclosure of said housing comprises said first aperture and said second aperture for placement of mounting bolts to said trailer frame;
   wherein said first end of said housing is recessed to receive said pivoting tongue assembly;
   wherein said first pin aperture and said second pin aperture of said housing are rotatably attached to said distal end of said pivoting tongue assembly via said second pin, said third bearing, and said fourth bearing, and act in a capacity of a universal joint as a first universal joint;
   wherein said proximate end of said pivoting tongue assembly is rotatably attached to said back end of said vehicle coupling assembly via said coupler pin aperture, said first pin, said first bearing, and said second bearing, and act in a capacity of a second universal joint;
   wherein said first universal joint and said second universal joint work in combination to promote ease of swiveling and decrease a turning radius;
   wherein said vehicle coupling assembly comprises said receiver pin aperture for removable attachment to a vehicle receiver;
   wherein said front end of said vehicle coupling assembly is able to be slidably placed into said vehicle receiver;
   wherein said pivoting trailer coupler assembly comprises in combination said housing, said pivoting tongue assembly, and said vehicle coupling assembly, said housing attachable to said trailer frame via said mounting bolts and rotatably attached to said pivoting tongue assembly; and
   wherein said pivoting tongue assembly is rotatably attached to said vehicle coupling assembly, said vehicle coupling assembly attachable to said vehicle receiver, said pivoting trailer coupler assembly useful to promote ease of movement when pulling a pull-trailer, thereby increasing safety and allowing for shorter turning radius when in an in-use condition.

2. The pivoting trailer coupler system of claim 1 wherein said vehicle coupling assembly comprises 1¼" square material.

3. The pivoting trailer coupler system of claim 1 wherein said vehicle coupling assembly comprises 2" square material.

4. The pivoting trailer coupler system of claim 2 wherein said vehicle coupling assembly comprises 2½" square material.

5. The pivoting trailer coupler system of claim 1 wherein said square tubing comprises ferrous material.

6. The pivoting trailer coupler system of claim 4 wherein said ferrous material of said vehicle coupling assembly comprises solid square stock.

7. The pivoting trailer coupler system of claim 1 wherein said pivoting trailer coupler assembly does not comprise a ball connector.

8. The pivoting trailer coupler system of claim 4 wherein said vehicle coupler assembly further comprises a brake safety switch.

9. The pivoting trailer coupler system of claim 1 wherein said pivoting trailer coupler assembly allows ease of connection with said vehicle via pivoting action via first universal joint and said second universal joint which are able to be moved in relation to one another.

10. The pivoting trailer coupler system of claim 9 wherein said vehicle coupler assembly and said housing are in coupled communication through said pivoting tongue assembly.

11. The pivoting trailer coupler system of claim 1 wherein said vehicle coupler assembly, said pivoting tongue assembly, and said housing occupy a same plane.

12. The pivoting trailer coupler system of claim 1 wherein said first bearing assembly and said second bearing assembly are vertically oriented in said coupler pin aperture of said vehicle coupling assembly.

13. The pivoting trailer coupler system of claim 12 wherein said first bearing assembly and said second bearing assembly are oriented parallel to each other.

14. The pivoting trailer coupler system of claim 10 wherein said third bearing assembly and said fourth bearing assembly are horizontally oriented in said first pin aperture and said second pin aperture of said housing.

15. The pivoting trailer coupler system of claim 14 wherein said third bearing assembly and said fourth bearing assembly are parallel to each other.

16. The pivoting trailer coupler system of claim 1 wherein said first pin and said second pin are retained in said housing by snap rings.

17. A pivoting trailer coupler system comprising:
    a pivoting trailer coupler assembly having;
       a housing having;
          an inner volume;
          an outer enclosure having, a first end, a second end, a first aperture; and a second aperture;
          a first pin aperture; and
          a second pin aperture;
       a pivoting tongue assembly having;
          an proximate end;
          a distal end;
          a first pin; and
          a second pin;
       a first bearing assembly;
       a second bearing assembly;
       a third bearing assembly; and
       a fourth bearing assembly;

a vehicle coupling assembly having;
    a front end;
    a back end;
    a coupler pin aperture, and;
    a receiver pin aperture;
wherein said pivoting trailer coupler assembly comprises in combination said housing, said pivoting tongue assembly, and said vehicle coupling assembly;
wherein said vehicle coupler assembly, said pivoting tongue assembly, and said housing occupy a same plane;
wherein said inner volume of said housing is defined by said outer enclosure;
wherein said outer enclosure is square tubing, said square tubing attachable to a trailer frame, said trailer frame fitting in said inner volume;
wherein said square tubing comprises ferrous material;
wherein said ferrous material comprises solid square stock;
wherein said opening of said second end of said housing is able to receive said trailer frame for fixable attachment;
wherein said outer enclosure of said housing comprises said first aperture and said second aperture for placement of mounting bolts to said trailer frame;
wherein said first end of said housing is recessed to receive said pivoting tongue assembly;
wherein said first pin aperture and said second pin aperture of said housing are rotatably attached to said distal end of said pivoting tongue assembly via said second pin, said third bearing, and said fourth bearing, and act in a capacity of a universal joint as a first universal joint;
wherein said third bearing assembly and said fourth bearing assembly are horizontally oriented in said first pin aperture and said second pin aperture of said housing;
wherein said third bearing assembly and said fourth bearing assembly are parallel to each other;
wherein said proximate end of said pivoting tongue assembly is rotatably attached to said back end of said vehicle coupling assembly via said coupler pin aperture, said first pin, said first bearing, and said second bearing; and act in a capacity of a second universal joint;
wherein said first bearing assembly and said second bearing assembly are vertically oriented in said coupler pin aperture of said vehicle coupling assembly;
wherein said first bearing assembly and said second bearing assembly are oriented parallel to each other;
wherein said first universal joint and said second universal joint work in combination to promote ease of swiveling and decrease a turning radius;
wherein said first pin and said second pin are retained in said housing by snap rings;
wherein said pivoting trailer coupler assembly allows ease of connection with said vehicle via pivoting action via first universal joint and said second universal joint which are able to be moved in relation to one another;
wherein said vehicle coupling assembly comprises said receiver pin aperture for removable attachment to a vehicle receiver;
wherein said vehicle coupler assembly further comprises a brake safety switch;
wherein said pivoting trailer coupler assembly does not comprise a ball connector;
wherein said front end of said vehicle coupling assembly is able to be slidably placed into said vehicle receiver;
wherein said vehicle coupler assembly and said housing are in coupled communication through said pivoting tongue assembly;
wherein said pivoting trailer coupler assembly comprises in combination said housing, said pivoting tongue assembly, and said vehicle coupling assembly; said housing attachable to said trailer frame via said mounting bolts and rotatably attached to said pivoting tongue assembly; and
wherein said pivoting tongue assembly is rotatably attached to said vehicle coupling assembly, said vehicle coupling assembly attachable to said vehicle receiver, said pivoting trailer coupler assembly useful to promote ease of movement when towing a pull-trailer, thereby increasing safety and allowing for shorter turning radius when in an in-use condition.

18. The pivoting trailer coupler system of claim 17 further comprises a kit including: at least one said pivoting trailer coupler assembly, one said receiver pin, two mounting bolts, two mounting bolt nuts, and a set of user instructions for installation.

* * * * *